US010294020B2

(12) United States Patent
Nordqvist et al.

(10) Patent No.: US 10,294,020 B2
(45) Date of Patent: May 21, 2019

(54) OPTICAL READABLE CODE SUPPORT AND CAPSULE FOR PREPARING A BEVERAGE HAVING SUCH CODE SUPPORT PROVIDING AN ENHANCED READABLE OPTICAL SIGNAL

(71) Applicant: NESTEC S.A., Vevey (CH)

(72) Inventors: David Nordqvist, Lausanne (CH); Daniel Abegglen, Rances (CH); Amaud Gerbaulet, Oye et Pallet (FR); Christian Jarisch, Lutry (CH)

(73) Assignee: Nestec S.A., Vevey (CH)

( * ) Notice: Subject to any disclaimer, the term of this patent is extended or adjusted under 35 U.S.C. 154(b) by 23 days.

(21) Appl. No.: 15/453,498

(22) Filed: Mar. 8, 2017

(65) Prior Publication Data

US 2017/0174419 A1    Jun. 22, 2017

Related U.S. Application Data

(63) Continuation of application No. 14/358,417, filed as application No. PCT/EP2012/072536 on Nov. 14, 2012, now abandoned.

(30) Foreign Application Priority Data

Nov. 15, 2011    (EP) .................................... 11189232

(51) Int. Cl.
*G06F 7/08*        (2006.01)
*B65D 85/804*    (2006.01)
(Continued)

(52) U.S. Cl.
CPC ...... *B65D 85/8043* (2013.01); *A47J 31/4492* (2013.01); *B29C 45/372* (2013.01);
(Continued)

(58) Field of Classification Search
CPC ................ A47J 31/4492; A47J 31/0673; A47J 31/3623; A47J 31/3695; A47J 31/3628;
(Continued)

(56) References Cited

U.S. PATENT DOCUMENTS 2,612,994 A    10/1952 Woodland
3,832,686 A    8/1974 Bilgutay
(Continued)

FOREIGN PATENT DOCUMENTS

| NL | 1015029 | 10/2001 |
|---|---|---|
| WO | 2011069830 | 6/2011 |
| WO | 2011141532 | 11/2011 |

OTHER PUBLICATIONS

Garg, Suresh, Sanjay Gupta and C.K. Ghosh. Wave Optics. "Lasers and Their Application." 2012, PHI Learning. p. 335.
(Continued)

*Primary Examiner* — Thien M Le
(74) *Attorney, Agent, or Firm* — K&L Gates LLP

(57) ABSTRACT

An optically readable code support to be associated with or be part of a capsule intended for delivering a beverage in a beverage producing device, the support including at least one sequence of symbols represented on the support so that each symbol is sequentially readable by a reading arrangement of an external reading device while the capsule is driven in rotation along an axis of rotation. The symbols are essentially formed of a succession of light reflective surface portions and light absorbing surface portions. The light absorbing surface portions provide a lower light-reflective intensity than the light-reflective surface portions, and the code support includes at least one base layer extending continuously at least along the sequence of symbols. The
(Continued)

light-absorbing surface portions are roughened surface portions having a higher rugosity (Rz) than the light-reflective surface portions.

14 Claims, 12 Drawing Sheets

(51) Int. Cl.
*A47J 31/44* (2006.01)
*G06K 19/06* (2006.01)
*B29C 45/37* (2006.01)
*B65D 25/20* (2006.01)
*B29K 23/00* (2006.01)
*B29L 11/00* (2006.01)
*B29L 31/00* (2006.01)

(52) U.S. Cl.
CPC ..... *B65D 25/205* (2013.01); *G06K 19/06018* (2013.01); *G06K 19/06028* (2013.01); *G06K 19/06046* (2013.01); *B29K 2023/06* (2013.01); *B29K 2023/12* (2013.01); *B29L 2011/00* (2013.01); *B29L 2031/7174* (2013.01)

(58) Field of Classification Search
CPC .............. A47J 31/3633; A47J 31/3638; A47J 31/3642; A47J 31/4407; A47J 31/446; B65D 2203/06; B65D 85/8043
USPC .......................................................... 235/381
See application file for complete search history.

(56) References Cited

U.S. PATENT DOCUMENTS

| | | | |
|---|---|---|---|
| 4,286,145 A * | 8/1981 | Palmer | G06K 7/10762 235/462.49 |
| 4,625,101 A | 11/1986 | Hinks | |
| 5,124,539 A | 6/1992 | Krichever | |
| 5,169,155 A * | 12/1992 | Soules | A63F 1/02 156/277 |
| 6,071,748 A | 6/2000 | Modlin et al. | |
| 7,044,386 B2 * | 5/2006 | Berson | G06K 1/123 235/491 |
| 7,673,558 B2 * | 3/2010 | Panesar | A47J 31/0673 99/275 |
| 9,980,596 B2 * | 5/2018 | Rognon | A47J 31/3623 |
| 2002/0048621 A1 * | 4/2002 | Boyd | A47J 31/3623 426/77 |
| 2003/0146288 A1 | 8/2003 | Berson | |
| 2004/0112222 A1 * | 6/2004 | Fischer | A47J 31/3628 99/279 |
| 2005/0224578 A1 | 10/2005 | Addington et al. | |
| 2007/0278316 A1 | 12/2007 | Hovis | |
| 2008/0187638 A1 * | 8/2008 | Hansen | A47J 31/0673 426/433 |
| 2009/0090786 A1 | 4/2009 | Hovis | |
| 2010/0078480 A1 * | 4/2010 | Aker | G06K 19/06009 235/462.08 |
| 2011/0172094 A1 * | 7/2011 | Deng | C08F 265/06 503/201 |
| 2014/0197444 A1 * | 7/2014 | Su | H01L 33/648 257/99 |

OTHER PUBLICATIONS

National Physics Laboratory. "What is emissivity and why is it important." Feb. 20, 2010. <http://www.npl.co.uk/reference/faqs/what-is-emissivity-and-why-is-it-important-(faq-thermal)>. Accessed Nov. 30, 2016.

* cited by examiner

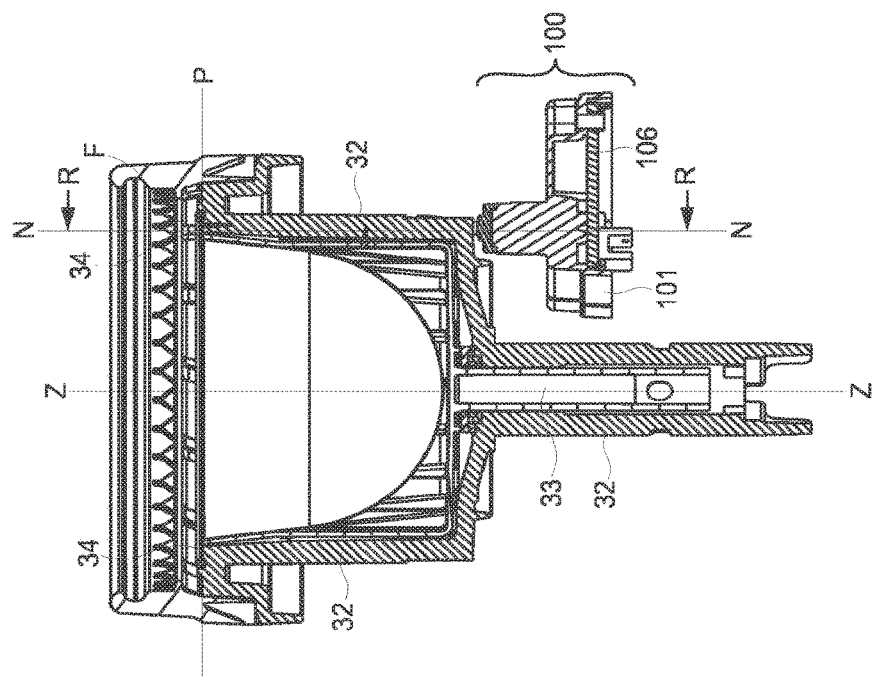
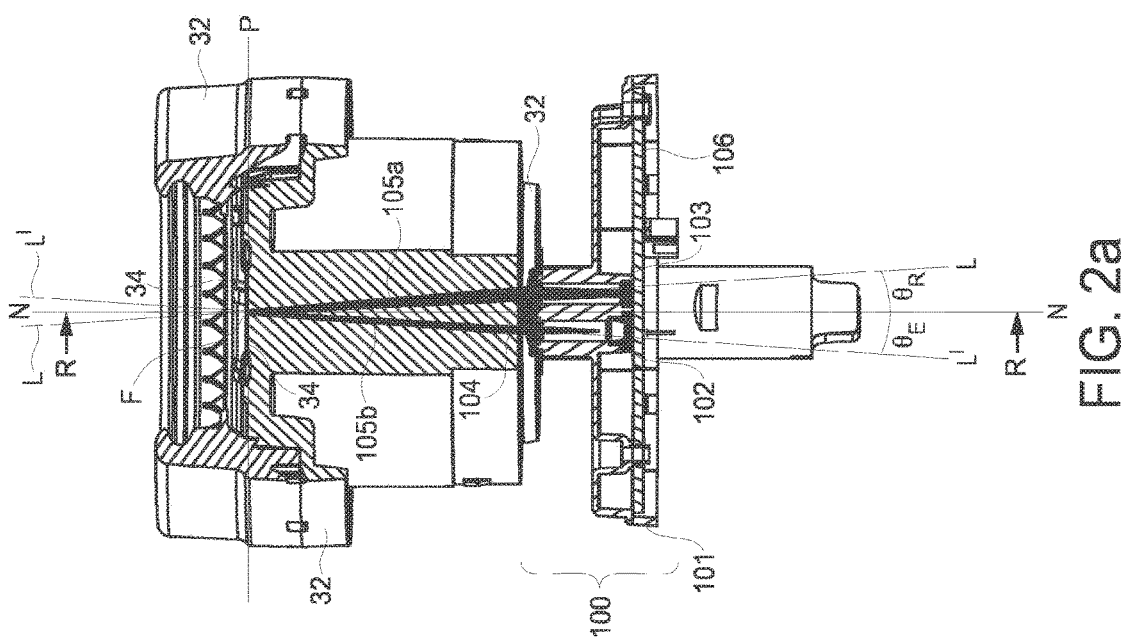

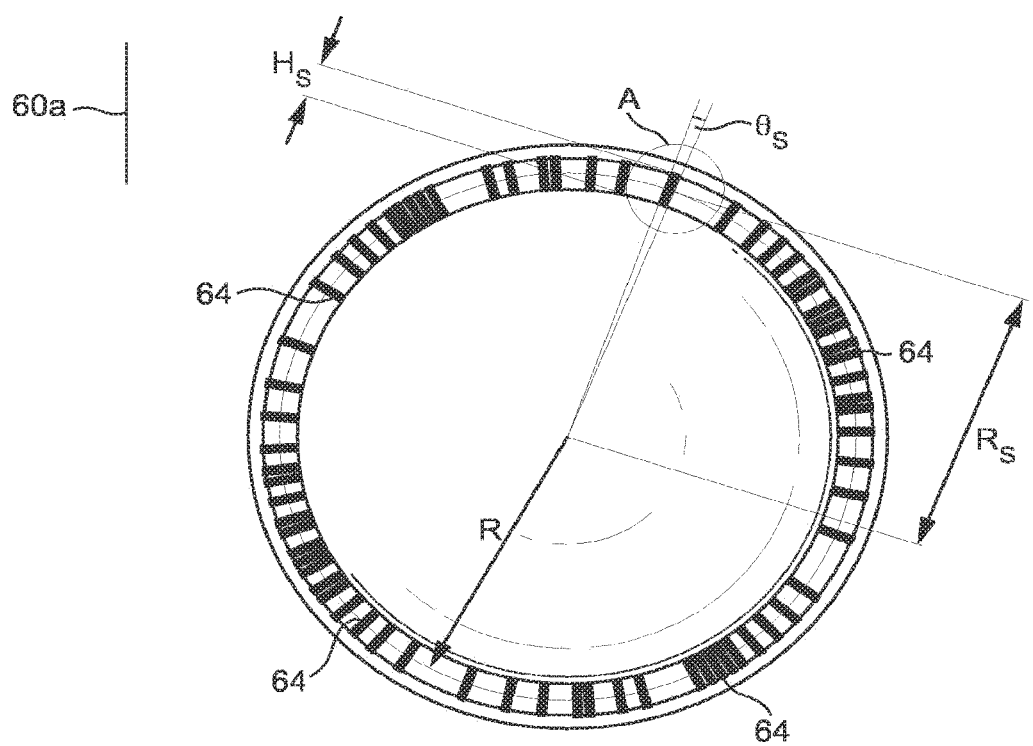
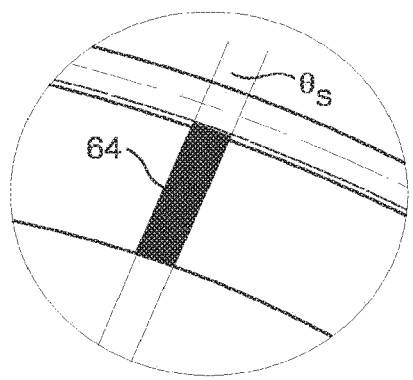
FIG. 4

OPTICAL READABLE CODE SUPPORT AND CAPSULE FOR PREPARING A BEVERAGE HAVING SUCH CODE SUPPORT PROVIDING AN ENHANCED READABLE OPTICAL SIGNAL

PRIORITY CLAIM

The present application is a continuation of U.S. patent application Ser. No. 14/358,417 filed May 15, 2014, which is a National Stage of International Application No. PCT/EP12/072536 filed Nov. 14, 2012, which claims priority to European Patent Application No. 11189232.9 filed Nov. 15, 2011, the entire contents of which are incorporated herein by reference.

FIELD OF THE INVENTION

The invention pertains to the field of the beverage preparation, in particular using capsules containing an ingredient for preparing a beverage in a beverage preparation machine. The present invention relates in particular to optical code supports adapted to store information related to a capsule, capsules associated with/or embedding a code support, reading and processing arrangements for reading and using such information for preparing a beverage.

BACKGROUND

For the purpose of the present description, a "beverage" is meant to include any human-consumable liquid substance, such as coffee, tea, hot or cold chocolate, milk, soup, baby food or the like. A "capsule" is meant to include any pre-portioned beverage ingredient or combination of ingredients (hereafter called "ingredient") within an enclosing packaging of any suitable material such as plastic, aluminum, a recyclable and/or bio-degradable material and combinations thereof, including a soft pod or a rigid cartridge containing the ingredient.

Certain beverage preparation machines use capsules containing an ingredient to be extracted or to be dissolved and/or an ingredient that is stored and dosed automatically in the machine or else is added at the time of preparation of the drink. Certain beverage machines comprise liquid filling means that include a pump for liquid, usually water, which pumps the liquid from a source of water that is cold or indeed heated through heating means, e.g. a thermoblock or the like. Certain beverage preparation machines are arranged to prepare beverages by using a centrifugal extraction process. The principle mainly consists in providing beverage ingredient in a container of the capsule, feeding liquid in the capsule and rotating the capsule at elevated speed to ensure interaction of liquid with powder while creating a gradient of pressure of liquid in the capsule; such pressure increasing gradually from the center towards the periphery of the receptacle. As liquid traverses the coffee bed, extraction of the coffee compounds takes place and a liquid extract is obtained that flows out at the periphery of the capsule.

Typically, it is suitable to offer to the user a range of capsules of different types containing different ingredients (e.g., different coffee blends) with specific taste characteristics, to prepare a variety of different beverages (e.g., different coffee types) with a same machine. The characteristics of the beverages can be varied by varying the content of the capsule (e.g., coffee weight, different blends, etc.) and by adjusting key machine parameters such as the supplied liquid volume or temperature, the rotational speed, the pressure pump. Therefore, there is a need for identifying the type of capsule inserted in the beverage machine to enable the adjustment of the brewing parameters to the inserted type. Moreover, it may also be desirable for capsules to embed additional information, for example safety information like use-by date or production data like batch numbers.

WO2010/026053 relates to a controlled beverage production device using centrifugal forces. The capsule may comprise a barcode provided on an outside face of the capsule and which enables a detection of the type of capsule and/or the nature of ingredients provided within the capsule in order to apply a predefined extraction profile for the beverage to be prepared.

It is known from the art, for example in document EP1764015A1, to print a local identifying barcode on the circular crown of a coffee wafer for use in a conventional coffee brewing machine.

Co-pending international patent application PCT/EP11/057670 relates to a support adapted to be associated with or be a part of a capsule for the preparation of a beverage. The support comprises a section on which at least one sequence of symbols is represented so that each symbol is sequentially readable, by a reading arrangement of an external device, while the capsule is driven in rotation along an axis of rotation, each sequence codes a set of information related to the capsule. Such invention enables to make a large volume of coded information available, such as about 100 bits of redundant or non-redundant information, without using barcode readers having moving parts like a scanning element which may raise severe concerns in terms of reliability. Another advantage is also to be able to read the code support by rotating the capsule while the capsule is in place, in a ready to brew position in the rotary capsule holder. However, one disadvantage lies in that those reading conditions remain specifically difficult for different reasons, such as because the incoming and outgoing rays of light must traverse the capsule holder when the capsule is held by the capsule holder, causing the loss of a great part of energy and/or because the light rays may incur significant angular deviations due to particular mechanical constraints born by the rotating assembly of the machine and possibly coming from different origins (e.g., vibrations, wearing, unbalanced mass distribution, etc.). Furthermore, it is not suitable to compensate the loss of reflectivity by improving the performance of the light emitting and sensing devices of the machine as it would make the beverage preparation machine too expensive.

Dutch patent NL1015029 relates to a code structure comprising a carrier with a barcode disposed thereon in the form of parallel bars, comprising first bars with a first reflection coefficient and second bars with a second reflection coefficient lower than the first reflection coefficient, wherein the first bars are made of a substantially retroreflective material and the second bars are made of mirror-reflective material. This bar code structure is specially designed to be recognized from a greater distance by already existing laser scanners, more particularly, by the use of retro-reflective materials, i.e., material wherein the peak of the reflection characteristic is measured at 180 degrees. However, such code structure poses a problem of proper detection of the reflected signals of the first and second bars due to the angular distance between the two reflected signals. Such solution is therefore detrimental for a compact reading system to be installed in a beverage preparation device.

Therefore, there is a need for providing an improved code support which enables to provide a reliable reading in the particular conditions met in a centrifugal beverage machine using capsules for the preparation of the beverage.

The present invention relates to an improved code support and capsule comprising said support in particular for providing an enhancement of the optical signal generated from the code support. In particular, a problem met with an optical code on a capsule is that light-reflecting and light-absorbing signals can be difficult to discriminate.

Another problem lies in that the support is relatively complex to integrate to the packaging structure forming the capsule itself and, in particular, manufacturing packaging constraints exist, such as the respect of proper material thickness for a proper forming of the capsule.

The present invention aims at providing solutions alleviating at least partially these problems.

In particular, there is a need for reliably reading information on a proper code support associated to or part of a capsule, in particular, a support able to generate an enhanced signal in particularly difficult reading conditions found in a centrifugal beverage machine. There is also a need for providing a support that is adapted for an easy integration to a capsule packaging material.

BRIEF DESCRIPTION

The present invention relates to an optically readable code support to be associated with or be part of a capsule intended for delivering a beverage in a beverage producing device, the support comprising at least one sequence of symbols represented on the support so that each symbol is sequentially readable by a reading arrangement of an external reading device while the capsule is driven in rotation along an axis of rotation, wherein the symbols are essentially formed of a pattern of light reflective surface portions and light absorbing surface portions; said light absorbing surface portions providing a lower light-reflective intensity than the light-reflective surface portions, wherein the code support comprises at least one base layer or structure extending continuously at least along said sequence of symbols, wherein the light-absorbing surface portions are roughened surface portions having higher rugosity (Rz) than the light-reflective surface portions.

In a mode, the light-reflective surface portions are non-roughened or mirror-reflective surfaces of the base layer or structure itself. In particular, the light-absorbing surfaces can be formed integrally in the base layer. The light-absorbing surfaces can be formed in the base layer or structure by any one of: sand blasting, shot blasting, milling, chemical attack, laser engraving, in-mold forming and combinations thereof.

In a possible alternative mode, the light absorbing surface portions are formed by one or more layer portions or deposit of roughened material applied onto the base layer or structure.

In another alternative, the light reflective surface portions are formed by one or more layer portions or deposit of material applied onto a base layer or structure of roughened surface. In such case, the superimposed layer or material can be a metal or an ink with metallic pigments or a metallic filler.

Preferably, the light-absorbing surfaces have a rugosity (Rz) of at least 2 microns, preferably between 2 and 100 microns, most preferably of about 5 and 10 microns. Preferably, the light-reflective surfaces have a rugosity of less than 2 microns, most preferably of 1 microns or less.

Preferably, the optically readable code support has an annular configuration so that it can be associated to a capsule, be part of or form the rim of a capsule intended for delivering a beverage producing device by centrifugation of the capsule in such device. The pattern of light reflective surface portions and light absorbing surface portions extends fully or partially on the circumference of the support. The optical properties of the support, as defined by the particular arrangement of the invention, are such that a reading of the code is made possible while the support is driven in rotation in the beverage device.

Preferably, the light-reflective surface portions and light-absorbing surface portions are arranged such that an incident light beam of given inclination is reflected, at a maximum of intensity, as reflected light beams within about the same reflection angle or reflection angles which differ one another of less than 90 degrees, preferably, differ one another of less than 45 degrees. In other words, the light reflective and light absorbing surface portions of the code support are not chosen amongst surfaces having one mirror-reflective properties and the other one retro-reflective properties.

In the context of the present invention, mirror-reflective properties refer to the reflection characteristics having a local maximum with a reflection angle equal to the angle normal to the direction from which the beam was transmitted. "Retro-reflective surfaces" are usually surfaces which reflect the incident light beam in a direction opposite to the direction from which the beam was transmitted, irrespective of the angle of the incident beam relative to the surface.

The optical properties of the support, as defined by the particular arrangement of the invention, are also such that a more robust reading of the code is made possible by transmitting the source light beam and reflected light beam within a reduced angle range enabling to build a reader system within a confined environment such it is the case in a beverage preparation device.

The invention further relates to a method for producing the optically readable code support, wherein the light-absorbing surfaces are formed integrally in the base layer and are obtained by any one of: sand blasting, shot blasting, milling, chemical attack, laser engraving, in-mold forming and combinations thereof. Preferably, the method comprises the injection molding of the code support from an injection-moldable material in an injection-mold, wherein the mold comprises a preferably annular molding surface; said surface comprising and a series of discrete roughened surface portions for molding the light-absorbing surface portions and a series of discrete mirror surface portions or portions having a lower rugosity than the roughened surface portions for molding the light-reflective surface portions.

The invention further relates to an injection-mold for producing the optical readable support by injection-molding of an injection-moldable material, wherein the mold comprises a preferably annular molding surface; said surface comprising a series of discrete roughened surface portions for molding the light-absorbing surface portions and a series of discrete mirror surface portions or portions having a lower rugosity than the roughened surface portions for molding the light-reflective surface portions.

The injection moldable material is preferably plastic such as polypropylene or polyethylene or compounded PP or PE or other polymers or copolymers. The molding surface of the mold can be formed as a continuous mirror surface or a continuous surface of very low rugosity (i.e., lower than 2 microns, preferably lower than 1 micron) and be selectively engraved to form the discrete roughened surface portions. Engraving can be obtained by laser, chemical attack, electrolysis, sand blasting, milling and the like.

The invention also relates to an optically readable code support to be associated with or be part of a capsule intended for delivering a beverage in a beverage producing device by centrifugation of the capsule, the support comprising at least one sequence of symbols represented on the support so that each symbol is sequentially readable by a reading arrangement of an external reading device while the capsule is driven in rotation along an axis of rotation, wherein the symbols are essentially formed of light reflective surfaces and light absorbing surfaces wherein the code support comprises a base structure extending continuously at least along said sequence of symbols and discontinuous discrete light-absorbing portions locally applied onto or formed at the surface of said base structure; wherein the discontinuous discrete light-absorbing portions form the light-absorbing surfaces and the base structure forms the light-reflective surfaces outside the surface areas occupied by the discrete light-absorbing portions; said discrete light-absorbing portions are arranged to provide a lower light-reflectivity than the one of the base structure outside the surface areas occupied by the discrete light-absorbing portions.

The discontinuous discrete light-absorbing portions of lower light-reflective refers to portions of light impact-able surfaces, providing a lower mean intensity than the mean intensity reflected by the reflective surfaces formed by the base structure outside these local areas occupied by said light-absorbing portions. The mean intensity is determined when these portions or surfaces are illuminated by an incoming beam of light forming an angle between 0 and 20°, at a wavelength between 380 and 780 nm, more preferably at 830-880 nm, and these portions or surfaces reflect an outgoing beam of light, in a direction forming an angle comprised between 0 and 20°. The identification of these surfaces can be correlated to the upwards and downwards jumps reflecting the transitions between the reflective and absorbing surfaces after filtering of the typical signal fluctuations and noises. These angles are determined relative to the normal to the light impact-able surfaces. Therefore, it should be noticed that such light-absorbing portions may still provide a certain level of reflected intensity, e.g., by specular and/or diffusion effect, within said defined angle ranges. However, the levels of reflected intensity between the reflective absorbing surfaces should be sufficiently distinct so that a discriminable signal is made possible.

Surprisingly, the proposed solution enables to improve the readability of the generated signal. Furthermore, it can form a structure which can be easily integrated to a capsule, e.g., be formed into a three-dimensional containment member (e.g., body and rim).

In particular, the light-reflective surfaces are obtained by a base structure of continuous arrangement, such as, for instance, forming an annular part of the flange-like rim of the capsule. It enables the use a larger choice of reflective packaging materials forming a sufficient thickness for a sufficiently good reflectivity. Materials for the base structure of the code support can form a part of the capsule and are prone to forming or molding into a cup-shaped body of the capsule, for example. The overlying arrangement of the light-absorbing surfaces on the base structure, by way of discrete portions, enables to more distinctively produce a signal of lower reflectivity compared to the light-reflective signal, in particular, in an environment where potentially a major part of the light energy is lost during transfer from the machine to the capsule.

More particularly, the light-reflective base structure comprises metal arranged in the structure to provide the light reflective surfaces. In particular, the light-reflective base structure comprises a monolithic metal support layer and/or a layer of light-reflective particles preferably metal pigments in a polymeric matrix. When metal is used as part of the base structure, it can advantageously serve for providing both an effective reflective signal and a layer constituting part of the capsule which may be formed into a complex three dimensional shape and confer a strengthening and/or protective function, for example, a gas barrier function. The metal is preferably chosen amongst the group consisting of: aluminum, silver, iron, tin, gold, copper and combinations thereof. In a more specific mode, the light-reflective base structure comprises a monolithic metal support layer coated by a transparent polymeric primer so as to form the reflective surfaces. The polymeric primer enables to level the reflecting surface of metal for an improved reflectivity and provides an improved bonding surface for the light absorbing portions applied thereon. The primer provides formability to the metal layer by reducing the wearing forces during forming. The primer also protects the metal layer from scratching or other deformation that could impact on the reflectivity of the surfaces. The transparency of the primer should be such that the loss of light intensity in the determined conditions through the layer is negligible. The primer also avoids a direct food contact with the metal layer. In an alternative, the base structure comprises an inner polymeric layer coated by an outer metallic layer (e.g., by vapor metallization of the polymeric layer). Preferably, the non-metallic transparent polymeric primer has thickness of less than 5 microns, most preferably a thickness between 0.1 and 3 microns. The thickness as defined provides a sufficient protection against direct food contact with metal and maintains, for enhanced reflectivity purpose, levels the surface irregularities of the metal and provides a glossy effect of the metal surface positioned underneath.

In a different mode, the light-reflective base structure comprises a monolithic metal support layer or polymeric support layer; said layer being coated by a lacquer comprising light-reflective particles, preferably metal pigments. The lacquer has a larger thickness than a primer so that it can advantageously contain reflective pigments. The lacquer has preferably a thickness higher than 3 microns and less than 10 microns, preferably comprised between 5 and 8 microns. The lacquer forms a light-reflective layer that improves the reflectivity of the metal layer positioned underneath. The reflectivity is dependent on the ratio of metal pigments to the polymer (in % by wt.). The ratio of metal pigment can also be increased above wt. 10% for a non-metallic support layer to ensure the sufficient reflective properties of the base structure.

Both the primer and lacquer improve the formability of the metal layer by reducing the wearing forces during forming (e.g., deep drawing) thereby enabling to consider the code support as a formable structure to produce the body of the capsule. The chemical base of the primer or lacquer is preferably chosen amongst the list of: polyester, isocyanate, epoxy and combinations thereof. The application process of the primer or lacquer on the support layer depends on the thickness of the polymeric layer and the ratio of pigments in the film since such ratio influences the viscosity of the polymer. For example, the application of the primer or lacquer on the metal layer can be made by solvation, for example, by applying the metal layer with a polymeric containing solvent and submitting the layer to a temperature above the boiling point of the solvent to evaporate the solvent and enabling curing of the primer or lacquer and to fix it onto the metal layer.

Preferably, the discontinuous light-absorbing portions are formed by an ink applied onto the said base structure. The ink has preferably a thickness between 0.25 and 3 microns. Several ink layers can be applied to form the light-absorbing portions, of, for instance, 1 micron-thick, to provide several printed ink layers in a register. The ink portions reflect a lower light intensity compared to the reflective surfaces formed by the base structure. For the light-absorbing portions, the ink preferably comprises at least 50% by weight of pigments, more preferably about 60% by weight. The pigments are chosen amongst those essentially absorbing light at sensibly 830-850 nm of wavelength. Preferred pigments are black pigments or color (non-metallic) pigments. As a matter of example, color pigments used in color pantone codes: 201C, 468C, 482C, 5743C, 7302C or 8006C, have provided satisfactory results. The application of ink to form the light-absorbing portions on the base structure can be obtained by any suitable process such as stamping, roto-engraving, photo-engraving, chemical treatment or offset printing.

In another mode, the discontinuous light-absorbing portions forms roughened surfaces of the base structure having a rugosity (Rz) of at least 2 microns, preferably between 2 and 10 microns, most preferably of about 5 microns. On the contrary, the light-reflective surfaces can be obtained by mirroring surfaces having a lower rugosity than the rugosity of the discontinuous light-absorbing portions. More particularly, the mirroring surfaces of the base structure are below 5 microns, preferably comprised between 0.2 and 2 microns. As known per se, the rugosity (Rz) is the arithmetic mean value of the single roughness depths of consecutive sampling lengths, where Z is the sum of the height of the highest peaks and the lowest valley depth within a sampling length.

The roughened surface portions can preferably be formed by applying a roughened layer of ink on the base structure. The roughness of the layer of ink is determined by its rugosity (Rz) at the surface of the layer after drying.

The roughened surface of the base structure can also be obtained by any suitable technique such as sanding, shot blasting, milling, laser engraving, in-mold forming and combinations thereof. For instance, the roughness can also be obtained by applying onto the base structure, a polymeric lacquer containing mat pigments to provide the desired rugosity. The light-absorbing lacquer can be applied, for example, on the whole surface of the base structure and be locally removed to uncover the reflective surfaces formed by the metal layer, e.g., aluminum, underneath, such as by burning with said lacquer, using a laser or any equivalent means.

In an alternative, the respectively roughened surfaces for the absorbing surfaces and mirror surfaces for the reflective surfaces can be formed by in-mold forming. For example, it requires the use of a mold cavity comprising selectively positioned roughened surfaces and mirror surfaces and forming such base structure having such mirror and roughened surfaces, such as by injection-molding.

Preferably, the sequence of symbols comprises between 100 and 200 symbols sequentially readable on the support. More preferably, it comprises between 140 and 180 symbols, most preferably 160 symbols. Each symbol forms covers an area having an arcuate sector, along the circumferential extension direction of the sequence, lower than 5°, more preferably between 1.8° and 3.6°, most preferably comprised between 2 and 2.5°. Each individual symbol may take a rectangular, trapezoidal, circular shape.

The invention relates to a capsule comprising an optically readable code support as aforementioned.

The invention further relates to a capsule indented for delivering a beverage in a beverage producing device by centrifugation comprising a body, a flange-like rim and an optically readable code support as aforementioned, wherein the code support is an integral part of at least the rim of the capsule, wherein the body and rim of the capsule are obtained by forming, such as by deep drawing, a flat or preformed structure comprising said support.

The invention further relates to an optical readable code support according to any one of the dependent claims attached.

BRIEF DESCRIPTION OF THE FIGURES

The present invention will be better understood thanks to the detailed description which follows and the accompanying drawings, which are given as non-limiting examples of embodiments of the invention, namely:

FIG. 2a, 2b illustrate an embodiment of the centrifugal cell with a capsule holder;

FIG. 4 illustrates an embodiment of a code support according to the invention;

DETAILED DESCRIPTION OF THE INVENTION

Figure 1:
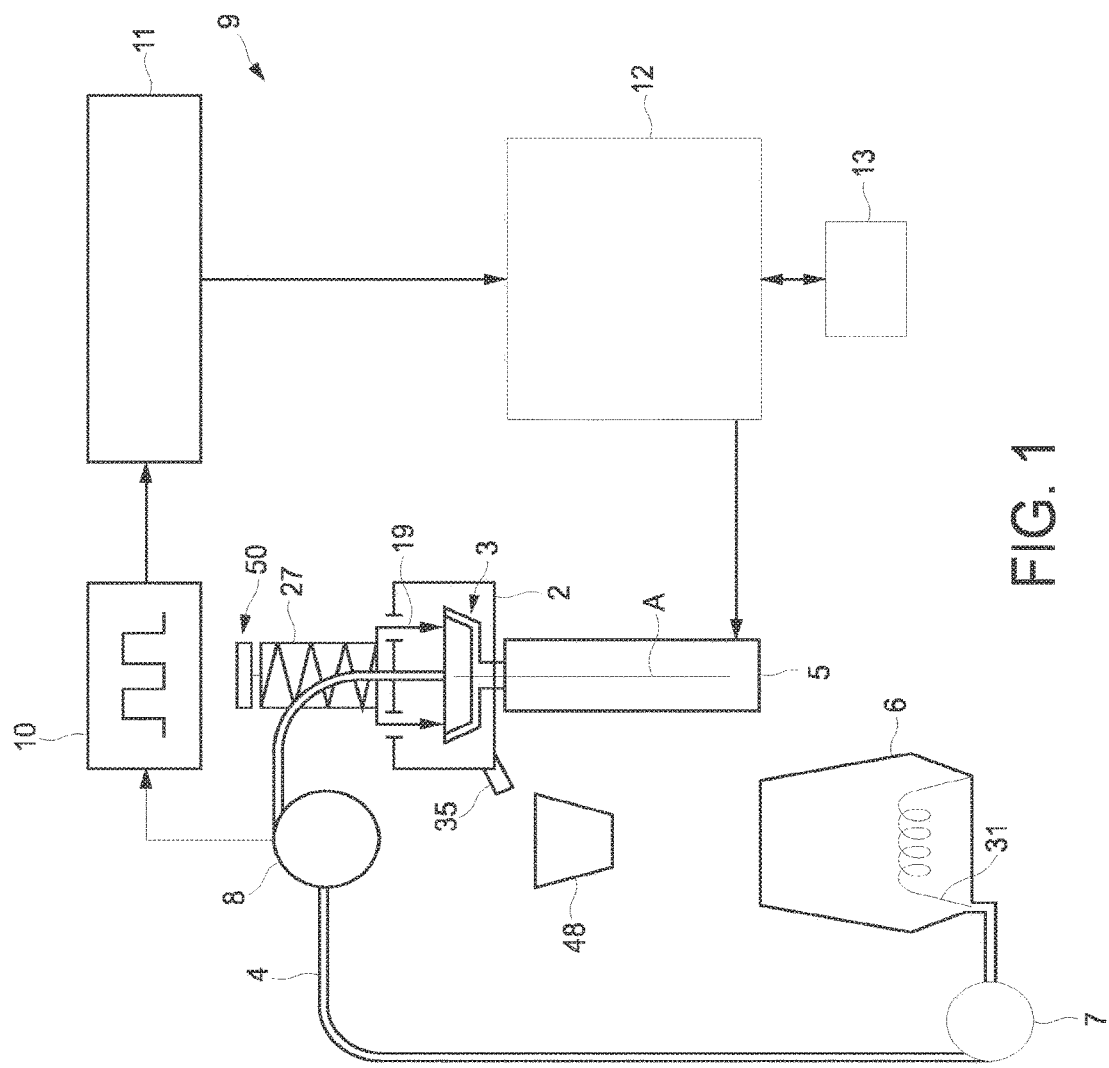
FIG. 1 illustrates the basic principle of the centrifugal extraction.

FIG. 1 illustrates an example of a beverage preparation system 1 as described in WO2010/026053 for which the capsule of the invention can be used.

The centrifugal unit 2 comprises a centrifugal cell 3 for exerting centrifugal forces on the beverage ingredient and liquid inside the capsule. The cell 3 may comprise a capsule holder and a capsule received therein. The centrifugal unit is connected to driving means 5 such as a rotary motor. The centrifugal unit comprises a collecting part and an outlet 35. A receptacle 48 can be disposed below the outlet to collect the extracted beverage. The system further comprises liquid supply means such as a water reservoir 6 and a fluid circuit 4. Heating means 31 may also be provided in the reservoir or along the fluid circuit. The liquid supply means may further comprise a pump 7 connected to the reservoir. A flow restriction means 19 is provided to create a restriction to the flow of the centrifuged liquid which leaves the capsule. The system may further comprise a flow meter such as a flow-metering turbine 8 for providing a control of the flow rate of water supplied in the cell 3. The counter 11 can be connected to the flow-metering turbine 8 to enable an analysis of the generated impulse data 10. The analyzed data is then transferred to the processor 12. Accordingly, the exact actual flow rate of the liquid within the fluid circuit 4 can be calculated in real-time. A user interface 13 may be provided to allow the user to input information that is transmitted to the control unit 9. Further characteristics of the system can be found in WO2010/026053.

Figure 3A:
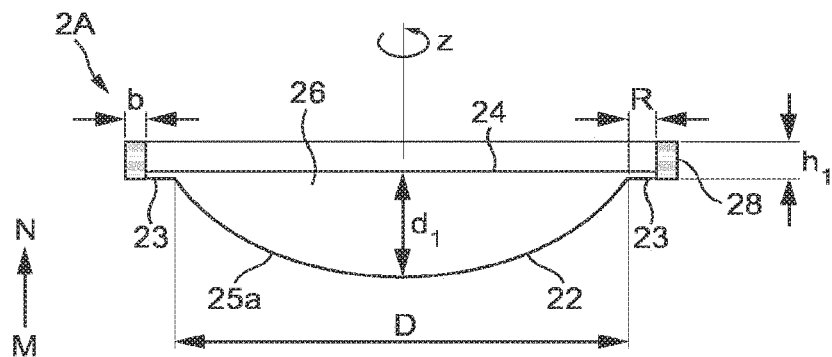
FIG. 3a, 3b, 3c illustrate an embodiment of a set of capsules according to the invention.
Figure 3B:
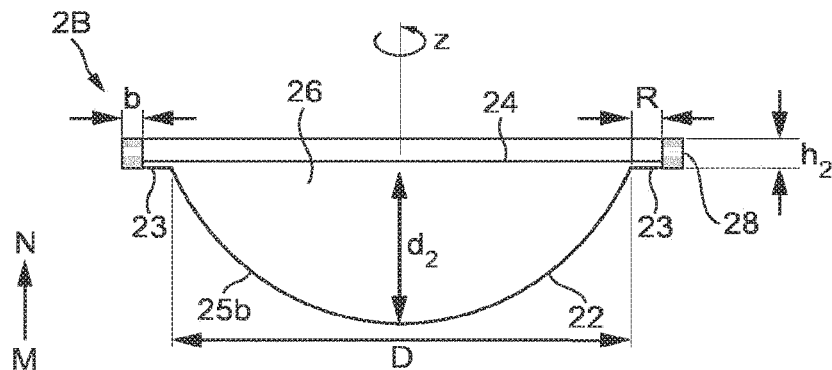
Figure 3C:
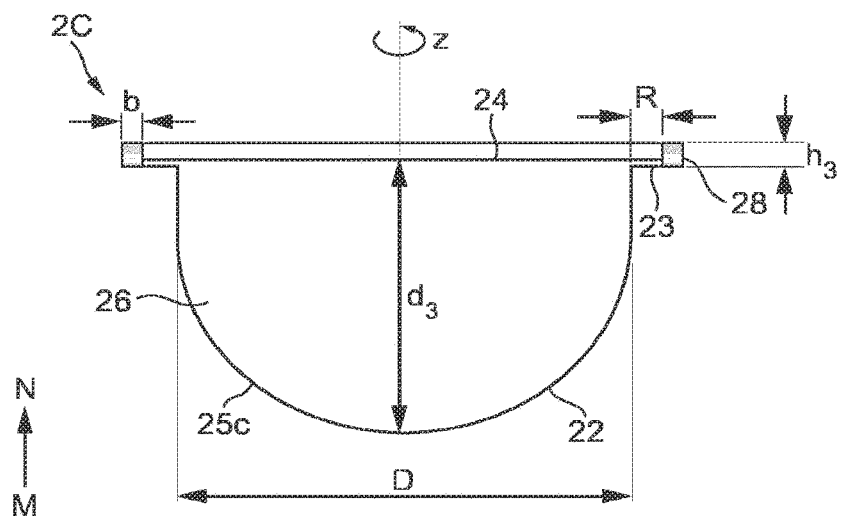

FIGS. 3*a*, 3*b* and 3*c* relate to an embodiment of a set of capsules 2A, 2B, and 2C. The capsules preferably comprise a body 22, a rim 23 and an upper wall member respectively a lid 24. The lid 24 may be a performable membrane or an aperture wall. Thereby the lid 24 and the body 22 enclose an enclosure respectively ingredients compartment 26. As shown in the figures, the lid 24 is preferably connected onto an inner annular portion R of the rim 23 that is preferably between 1 to 5 mm.

The rim is not necessarily horizontal as illustrated. It can be slightly bended. The rim 23 of the capsules preferably extends outwardly in a direction essentially perpendicular (as illustrated) or slightly inclined (if bended as aforementioned) relative to the axis of rotation Z of the capsule. Thereby, the axis of rotation Z represents the axis of rotation during centrifugation of the capsule in the brewing device, and in particular is sensibly identical to the axis of rotation Z of the capsule holder 32 during centrifugation of the capsule in the brewing device.

It should be understood that the shown embodiment is just an exemplary embodiment and that the capsules in particular the capsule body 22 can take various different embodiments.

The body 22 of the respective capsule has a single convex portion 25*a*, 25*b*, 25*c* of variable depth, respectively, d1, d2, d3. Thereby, the portion 25*a*, 25*b*, 25*c* may as well be a truncated or a partially cylindrical portion.

Hence, the capsules 2A, 2B, 2C preferably comprise different volumes but, preferably, a same insertion diameter 'D'. The capsule of FIG. 3*a* shows a small volume capsule 2A whereas the capsule of FIGS. 3*b* and 3*c* show a larger volume capsule 2B respectively 2C. The insertion diameter 'D' is hereby determined at the line of intersection between the lower surface of the rim 23 and the upper portion of the body 22. However, it could be another referencing diameter of the capsule in the device.

The small volume capsule 2A preferably contains an amount of extraction ingredient, e.g., ground coffee, smaller than the amount for the large volume capsules 2B, 2C. Hence, the small capsule 2A is intended for delivery of a short coffee of between 10 ml and 60 ml with an amount of ground coffee comprised between 4 and 8 grams. The larger capsules 2B is intended for delivery of a medium-size coffee, e.g., between 60 and 120 ml and the largest capsule is intended for delivery of a long-size coffee, e.g., between 120 and 500 ml. Furthermore, the medium-size coffee capsule 2B can contain an amount of ground coffee comprised between 6 and 15 grams and the long-size coffee capsule 2C can contain an amount of ground coffee between 8 and 30 grams.

In addition, the capsules in the set according to the invention may contain different blends of roast and ground coffee or coffees of different origins and/or having different roasting and/or grinding characteristics.

The capsule is designed for rotating around the axis Z. This axis Z crosses perpendicularly the center of the lid which has the form of a disk. This axis Z exits at the center of the bottom of the body. This axis Z will help to define the notion of "circumference" which is a circular path located on the capsule and having the axis Z as reference axis. This circumference can be on the lid, e.g. lid or on the body part such as on the flange-like rim. The lid may be impervious to liquid before insertion in the device or it may be pervious to liquid by means of small openings or pores provided in the center and/or periphery of the lid.

Hereafter, the lower surface of the rim 23 refers to the section of the rim 23 that is located outside the enclosure formed by the body and the lid, and is visible when the capsule is oriented on the side where its body is visible.

Further characteristics of the capsules or the set capsules can be found in documents WO 2011/0069830, WO 2010/0066705, or WO2011/0092301.

An embodiment of the centrifugal cell 3 with a capsule holder 32 is illustrated by FIGS. 2*a* and 2*b*. The capsule holder 32 forms in general a cylindrical or conical wide shaped cavity provided with an upper opening for inserting the capsule and a lower bottom closing the receptacle. The opening has a diameter slightly larger than the one of the body 22 of the capsule. The outline of the opening fits to the outline of the rim 23 of the capsule configured to lean on the edge of the opening when the capsule is inserted. As a consequence, the rim 23 of the capsule rests at least partially on a receiving part 34 of the capsule holder 32. The lower bottom is provided with a cylindrical shaft 33 attached perpendicularly to the center of the external face of the bottom. The capsule holder 32 rotates around the central axis Z of the shaft 33.

An optical reading arrangement 100 is also represented in FIGS. 2*a* and 2*b*. The optical reading arrangement 100 is configured to deliver an output signal comprising information related to a level of reflectivity of a surface of the lower surface of the rim 23 of a capsule leaning on the receiving part 34 of the capsule holder 32. The optical reading arrangement is configured to perform optical measurements of the surface of the lower surface of the rim 23 through the capsule holder 32, more particularly through a lateral wall of the cylindrical or conical wide shaped capsule holder 32. Alternatively, the output signal may contain differential information, for instance differences of reflectivity over time, or contrast information. The output signal may be analog, for example a voltage signal varying with the information measured over the time. The output signal may be digital, for example a binary signal comprising numerical data of the information measured over the time.

In the embodiment of FIGS. 2*a* and 2*b*, the reading arrangement 100 comprises a light emitter 103 for emitting a source light beam 105*a* and a light receiver 102 for receiving a reflected light beam 105*b*.

Typically the light emitter 103 is a light-emitting diode or a laser diode, emitting an infrared light, and more particularly a light with a wavelength of 850 nm. Typically, the light receiver 103 is a photodiode, adapted to convert a received light beam into a current or voltage signal.

The reading arrangement 100 comprises also processing means 106 including a printed circuit board embedding a processor, sensor signal amplifier, signal filters and circuitry for coupling said processing means 106 to the light emitter 103, the light receiver 102 and to the control unit 9 of the machine.

The light emitter 103, the light receiver 102, and the processing means 106 are maintained in a fixed position by a support 101, rigidly fixed relatively to the machine frame. The reading arrangement 100 stays into its position during an extraction process and is not driven into rotation, contrary to the capsule holder 32.

In particular, the light emitter 103 is disposed so as the source light beam 105a is generally oriented along a line L crossing at a fixed point F the plane P comprising the receiving part 34 of the capsule holder 32, said plane P having a normal line N passing through the point F. The fixed point F determines an absolute position in space where the source light beams 105a is intended to hit a reflective surface: the position of the fixed point F remains unchanged when the capsule holder is rotated. The reading arrangement may comprise focusing means 104, using for example holes, lenses and/or prisms, to make the source light beam 105 converging more efficiently to the fixed point F of the lower surface of the lid of a capsule positioned into the capsule holder 32. In particular, the source light beam 105 may be focused so as to illuminate a disc centered sensibly on the fixed point F and having a diameter d.

The reading arrangement 100 is configured so as the angle $\theta_E$ between the line L and the normal line N is comprised between 2° and 10°, and in particular between 4° and 5° as shown in FIG. 2a. As a consequence, when a reflecting surface is disposed at the point F, the reflected light beam 105b is generally oriented along a line L', crossing the fixed point F, the angle $\theta_R$ between the line L' and the normal line N being comprised between 2° and 10°, and in particular between 4° and 5° as shown in FIG. 2a. The light receiver 102 is disposed on the support 101 so as to gather at least partially the reflected light beam 105b, generally oriented along the line L'. The focusing means 104 may also be arranged to make the reflected light beam 105b concentrating more efficiently to the receiver 102. In the embodiment illustrated in FIG. 2a, 2b, the point F, the line L and the line L' are co-planar. In another embodiment, the point F, the line L and the line L' are not co-planar: for instance, the plane passing through the point F and the line F and the plane passing through the point F and the line L' are positioned at an angle of sensibly 90°, eliminating direct reflection and allowing a more robust reading system with less noise.

The capsule holder 32 is adapted to allow the partial transmission of the source light beam 105a along the line L up to the point F. For instance, the lateral wall forming the cylindrical or conical wide shaped cavity of the capsule holder is configured to be non-opaque to infra-red lights. Said lateral wall can be made of a plastic based material which is translucent to infra-red having entry surfaces allowing infra-red light to enter.

As a consequence, when a capsule is positioned in the capsule holder 32, the light beam 105a hits the bottom part of the rim of said capsule at point F, before forming the reflected light beam 105b. In this embodiment, the reflected light beam 105b passes through the wall of the capsule holder up to the receiver 102.

The section of the lower surface of the rim 23 of a capsule positioned into the capsule holder 32, illuminated at the point F by the source light beam 105, changes over the time, only when the capsule holder 34 is driven into rotation. So, a complete revolution of the capsule holder 32 is required for the source light beam 105 to illuminate the entire annular section of the lower surface of the rim.

The output signal may be computed or generated by measuring over the time the intensity of the reflected light beam, and possibly, by comparing its intensity to those of the source light beam. The output signal may be computed or generated by determining the variation over the time of the intensity of the reflected light beam.

The capsule according to the invention comprises at least one optically readable code support. The code support can be, in the present part of the flange-like rim. Symbols are represented on the optically code support. The symbols are arranged in at least one sequence, said sequence code a set of information related to the capsule. Typically, each symbol corresponds to a specific binary value: a first symbol may represent a binary value of '0', whereas a second symbol may represent a binary value of '1'.

In particular, the set of information of at least one of the sequences may comprise information for recognizing a type associated to the capsule, and/or one or a combination of items of the following list:

information related to parameters for preparing a beverage with the capsule, such as the optimal rotational speeds, temperatures of the water entering the capsule, temperatures of the collector of the beverage outside the capsule, flow rates of the water entering the capsule, sequence of operations during the preparation process, etc;

information for retrieving locally and/or remotely parameters for preparing a beverage with the capsule, for example an identifier allowing the recognition of a type for the capsule;

information related to the manufacturing of the capsule, such a production batch identifier, a date of production, a recommended date of consumption, an expiration date, etc;

information for retrieving locally and/or remotely information related to the manufacturing of the capsule.

Each set of information of at least one of the sequences may comprise redundant information. Hence, error-checking may be performed by comparison. It also improves by the way the probability of a successful reading of the sequence, should some parts of the sequence be unreadable. The set of information of at least one of the sequences may also comprise information for detecting errors, and/or for correcting errors in said set of information. Information for detecting errors may comprise repetition codes, parity bits, checksums, cyclic redundancy checks, cryptographic hash function data, etc. Information for correcting errors may comprise error-correcting codes, forward error correction codes, and in particular, convolutional codes or block codes.

The symbols arranged in sequences are used to represent data conveying the set of information related to the capsule. For instance, each sequence may represent an integer number of bits. Each symbol may encode one or several binary bits. The data may also be represented by transitions between symbols. The symbols may be arranged in the sequence using a modulation scheme, for example a line coding scheme like a Manchester code.

Each symbol may be printed and/or embossed. Each symbol may be obtained by treating the code support to have a given roughness. The shape of the symbols may be chosen amongst the following non-exhaustive list: arch-shaped segments, segments which are individually rectilinear but extend along at least a part of the section, dots, polygons, geometric shapes.

In an embodiment, each sequence of symbols has a same fixed length, and more particularly has a fixed number of symbols. The structure and/or pattern of the sequence being known, it may ease the recognition of each sequence by the reading arrangement.

In an embodiment, at least one preamble symbol is represented in the section, so as to allow the determination of a start and/or a stop position in the section of each sequence. The preamble symbol is chosen to be identified separately from the other symbols. It may have a different shape and/or different physical characteristics compared with the other symbols. Two adjacent sequences may have a common preamble symbol, representing the stop of one sequence and the start of the other one.

In an embodiment, at least one of the sequences comprises symbols defining a preamble sequence, so as to allow the determination of a position of the symbols in said sequence code the set of information related to the capsule. The symbols defining a preamble may code a known reserved sequence of bits, for example '10101010'.

In an embodiment, the preamble symbols and/or the preamble sequences comprise information for authenticating the set of information, for example a hash code or a cryptographic signature.

The symbols are distributed sensibly on at least ⅛th of the circumference of the annular support, preferably, on the entire circumference of the annular support. The code may comprise successive arch-shaped segments. The symbols may also comprise successive segments which are individually rectilinear but extend along at least a part of the circumference.

The sequence is preferably repeated along the circumference in order to ensure a reliable reading. The sequence is repeated at least twice on the circumference. Preferably, the sequence is repeated three to six times on the circumference. Repetition of the sequence means that the same sequence is duplicated and the successive sequences are positioned in series along the circumference so that upon a 360-degree rotation of the capsule, the same sequence can be detected or read more than one time.

Referring to FIG. 4, an embodiment 30a of a code support is illustrated. The code support 60a occupies a defined width of the rim 23 of the capsule. The rim 23 of the capsule can comprise essentially an inner annular portion forming the support 60a and an outer (non-coded) curled portion. However, it can be that the full width of the rim is occupied by the support 60a, in particular, if the lower surface of the rim can be made substantially flat. This location is particularly advantageous since they offer both a large area for the symbols to be disposed and is less prone to damages caused by the processing module and in particular by the pyramidal plate, and to ingredients projections. As a consequence, the amount of coded information and the reliability of the readings are both improved. In this embodiment, the code support 60a comprises 160 symbols, each symbol code 1 bit of information. The symbols being contiguous, each symbol has a arc-linear length of 2.25°.

Figure 5:
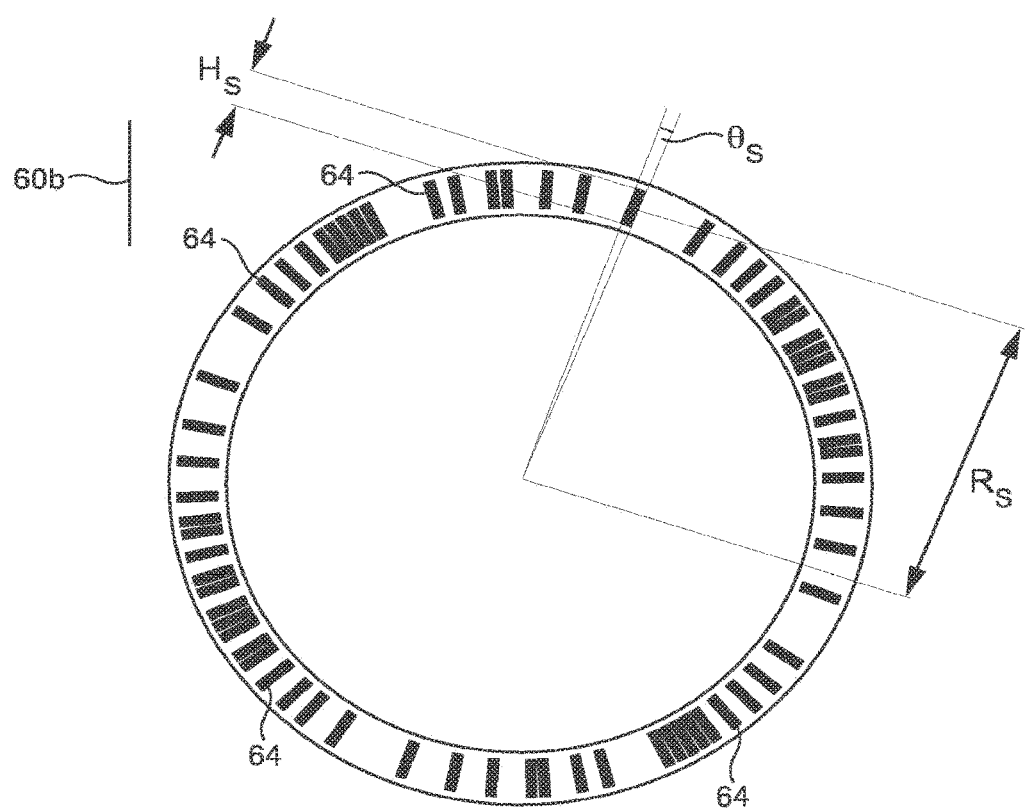
FIG. 5 illustrates an alternate position of the sequence on the capsule, in particular, when placed on the underside of the rim of the capsule, and the capsule fitted into a capsule holder of the extraction device.

Referring to FIG. 5, an embodiment 60b of a code support is illustrated in planar view. The code support 60b is adapted to be associated with or be part of a capsule, so as to be driven in rotation when the capsule is rotated around its axis Z by the centrifugal unit 2. The receiving section of the capsule is the lower surface of the rim 23 of the capsule. As illustrated on FIG. 5, the code support may be a ring having a circumferential part on which the at least one sequence of symbols is represented, so as the user can position it on the circumference of the capsule before introducing it into the brewing unit of the beverage machine. Consequently, a capsule without embedded means for storing information can be modified by mounting such a support so as to add such information. When the support is a separate part, it may be simply added on the capsule without additional fixing means, the user ensuring that the support is correctly positioned when entering the brewing unit, or the forms and the dimensions of the support preventing it from moving relatively to the capsule once mounted. The code support 60b may also comprise additional fixing means for rigidly fixing said element to the receiving section of the capsule, like glue or mechanical means, to help the support staying fixed relatively to the capsule once mounted. As also mentioned, the code support 60b may also be a part of the rim itself such as integrated to the structure of the capsule.

Each symbol is adapted to be measured by the reading arrangement 100 when the capsule is positioned into the capsule holder and when said symbol is aligned with the source light beam 105a at point F. More particularly, each different symbol presents a level of reflectivity of the source light beam 105a varying with the value of said symbol. Each symbol has different reflective and/or absorbing properties of the source light beam 105a.

Since the reading arrangement 100 is adapted to measure only the characteristics of the illuminated section of the code support, the capsule has to be rotated by the driving means until the source light beam has illuminated all the symbols comprised in the code. Typically, the speed for reading the code can be comprised between 0.1 and 2000 rpm.

Figure 6:
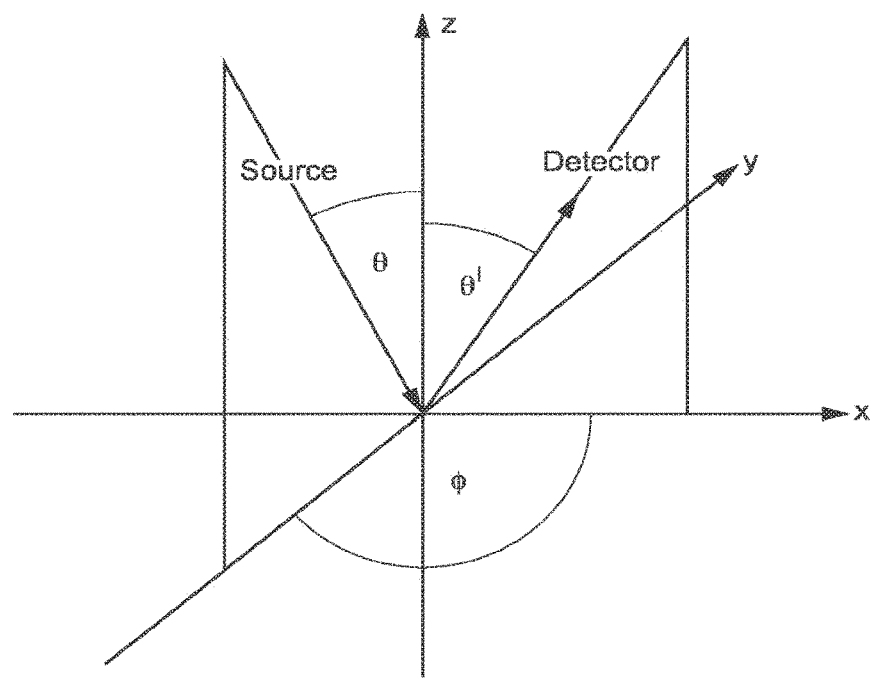
FIG. 6 illustrates by a schema an optical bench used to measure symbols on an embodiment of a capsule according to the invention.

The reflective characteristics of the code support of the invention are determined in defined laboratory conditions. In particular, a first symbol and a second symbol of an embodiment of a capsule that are suitable to be read reliably by the reading arrangement 100 have been measured independently using an optical bench represented on FIG. 6. The goniometric measurements of diffuse reflection of said symbols on the capsule are shown on FIG. 7 (reflected intensity of each symbol) and 8 (contrast between symbols).

Hereafter, the first symbol is more reflective than the second symbol. The set-up for the measurement of the diffuse reflected relative intensity of each symbol is built so as to able to modify independently the angle $\theta$ of a light source and the angle $\theta'$ of a light detector. The detector is a bare optical fiber connected to a power meter glued to a very fine mechanical tip which is fixed to the motorized detector arm. For all measurements, the angle $\theta$ between the source and detector planes is equal to $\theta=90°$. The light source is a laser diode emitting a light having a wavelength $\lambda=830$ nm.

Figure 7:
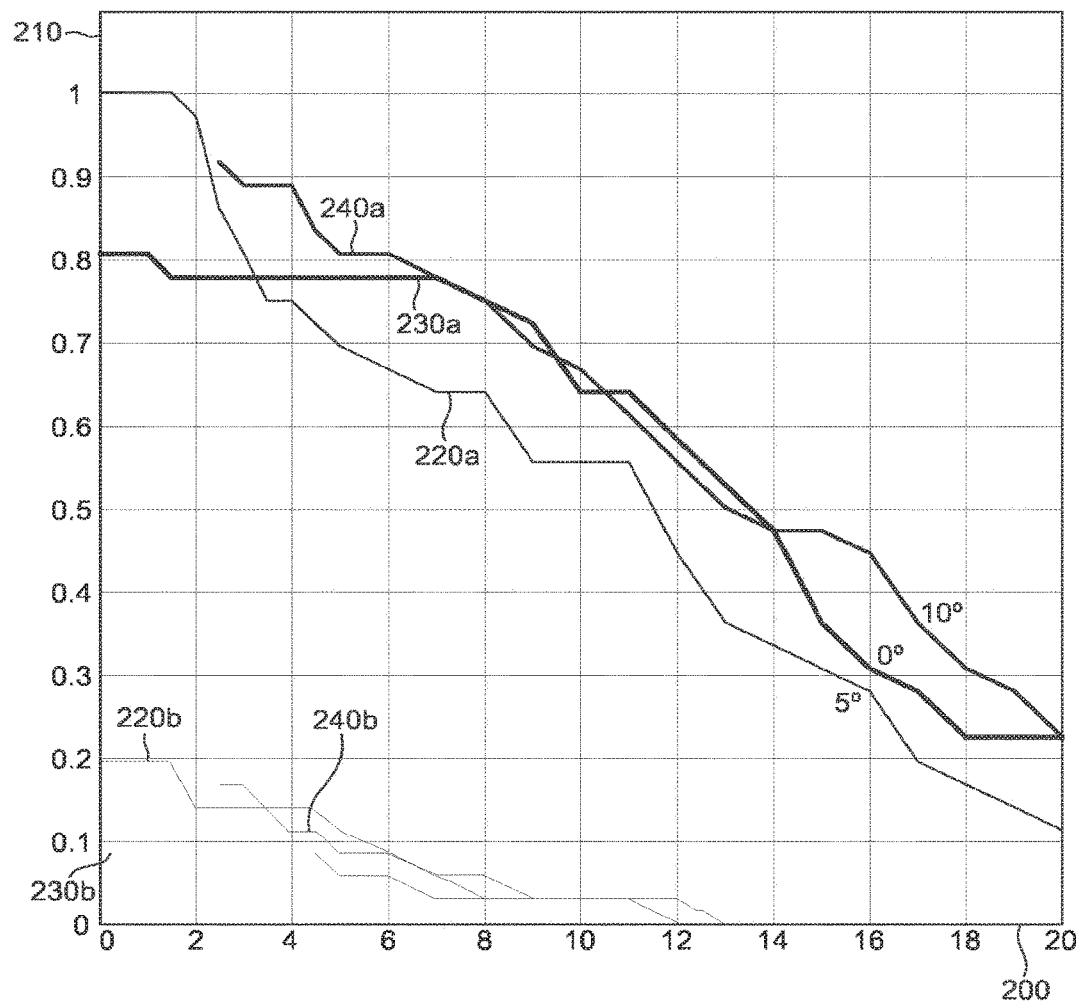
FIG. 7 show a diagram of the relative diffuse reflectivity of the symbols of an embodiment of a capsule according to the invention, as a function of the source and detector angles.

The diagram on FIG. 7 shows a relative diffuse reflectivity (axis 210) of the symbols of the capsule as a function of the detector angle $\theta'$ (axis 200). A reference intensity $E_{REF}$ of reflectivity is measured for the first symbol, with the detector angle set to 0° and the source angle set to 5°. The relative diffuse reflectivity of each symbol is calculated relatively to the reference intensity $E_{REF}$. The curves 220a, 230a, 240a shows respectively the relative diffuse reflectivity of the first symbol, at three different source angles $\theta=0°$, 5°, 10°. The curves 220b, 230b, 240b shows respectively the relative diffuse reflectivity of the second symbol, at three different source angles $\theta=0°$, 5°, 10°.

The relative diffuse reflectivity represents at least 60% of the reference intensity $E_{REF}$ for any value of the detector angle $\theta'$ comprises between 3° and 6° and for any value of the source angle $\theta$ comprises between 0° to 10°. In particular, the relative diffuse reflectivity represents at least 72% of the reference intensity $E_{REF}$ for any value of the detector angle $\theta'$ comprises between 2.5° and 4.4° and for any value of the source angle $\theta$ comprises between 0° to 10°.

Figure 8:
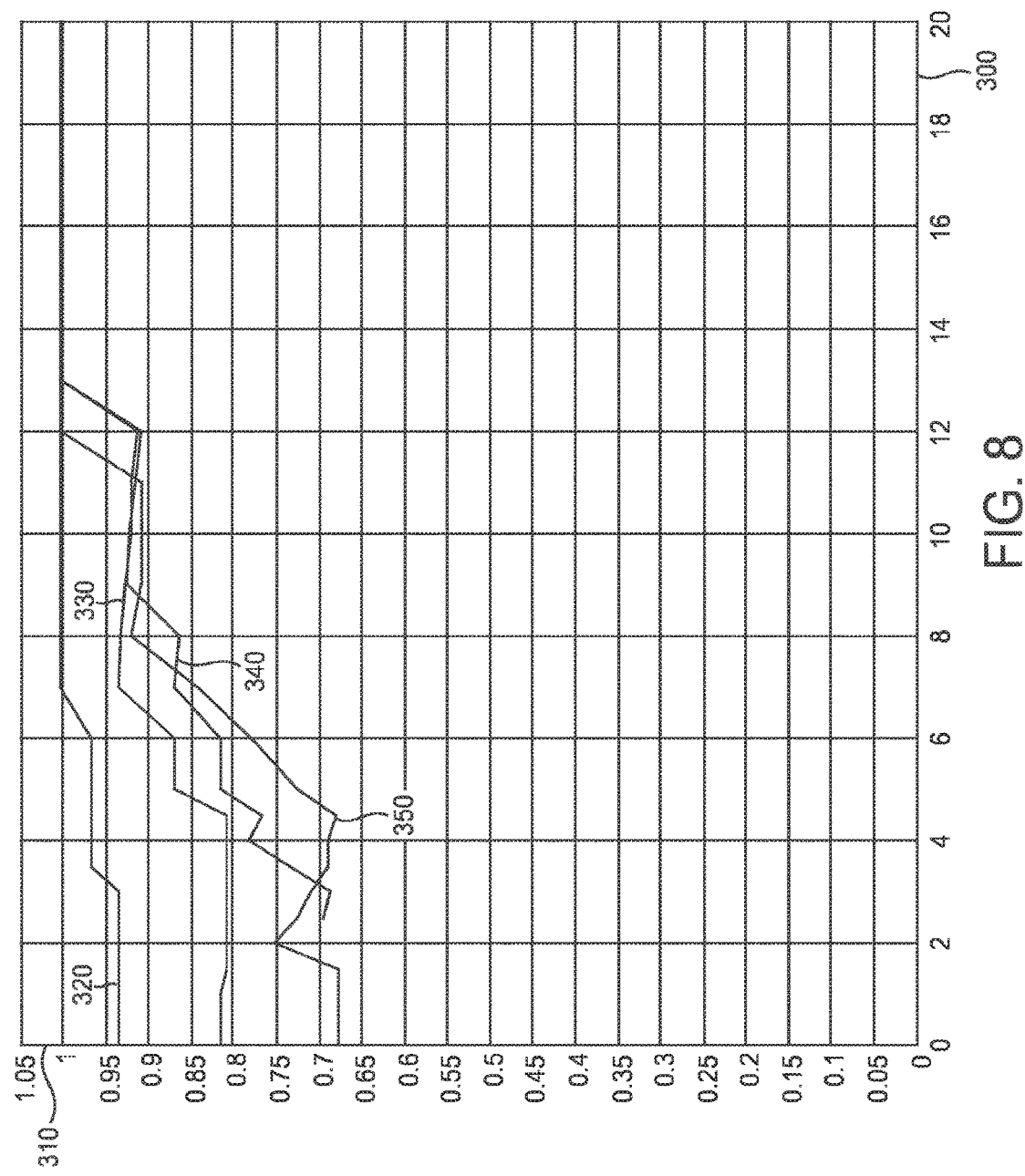
FIG. 8 show a diagram of the contrast between symbols of an embodiment of a capsule according to the invention, as a function of the source and detector angles.

The diagram on FIG. 8 shows the optical contrast (axis 310) between the first and the second symbols as a function of detector angle θ' (axis 300). The optical contrast is defined by the following mathematical expression $$\frac{i1 - i2}{i1 + i2}$$

where i1, i2 represent respectively the intensity reflected by the first, second symbol respectively to the detector, in a same given configuration of the angles θ and θ'. The curves 320, 330, 340, 350 show respectively, at four different source angles θ=0°, 5°, 10°, 15°, said optical contrast. The lowest contrast value is in any case is greater than 65%, which allows reliable signal processing. In particular, the optical contrast is greater than 80% for any value of the detector angle θ' comprises between 2.5° and 4.4° and for any value of the source angle θ comprises between 10° to 15°. In particular, the optical contrast is greater than 75% for any value of the detector angle θ' greater than 6° and for any value of the source angle θ comprises between 0° to 15°.

Figure 9:
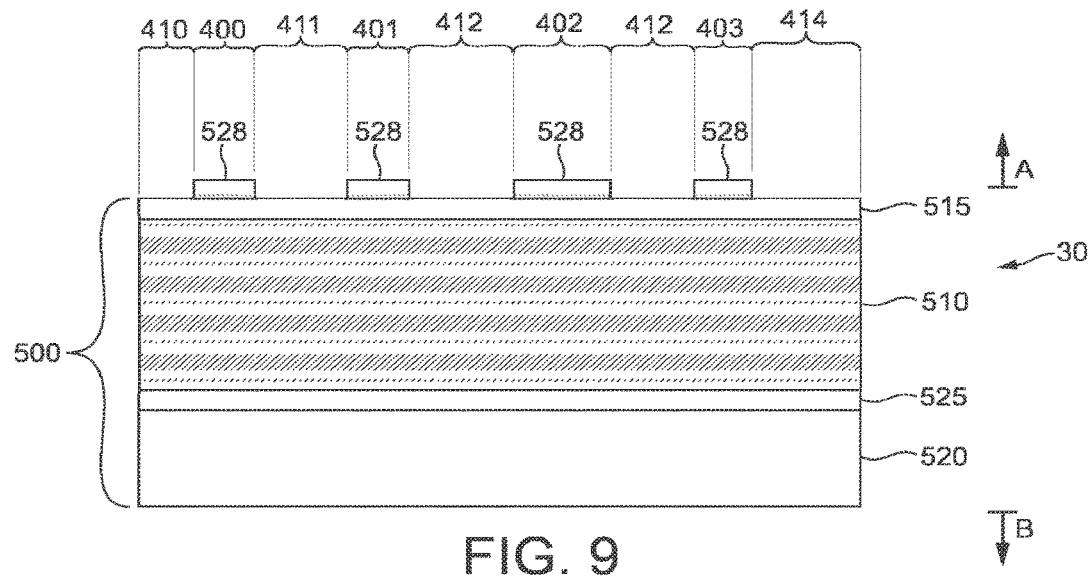
FIG. 9 is a first example of an optically readable coded support along circumferential cross-section view in radial direction R at the rim of the capsule of FIG. 4.

FIG. 9 illustrates a preferred mode of an optical readable code support 30 of the invention in cross-sectional circumferential view of FIG. 4. The code support 30 comprises a readable (external) side A and a non-readable (internal) side B. At its readable side A, the support comprises successive light-reflective surfaces 400-403 and light-absorbing surfaces 410-414. The light absorbing surfaces 410-414 are formed by a base structure 500 which comprises several superimposed layers whereas the light absorbing surfaces 400-403 are formed by overlying on the base structure in local circumferential areas, discontinuous discrete portions of light absorbing material, preferably discrete portions of ink layers 528, applied onto the base structure. The base structure comprises a preferably monolithic layer of metal 510, preferably aluminum (or an alloy of aluminum) onto which is coated a transparent polymeric primer 515, preferably made of isocyanate or polyester. The thickness of metal, e.g., aluminum layer, can be a determining factor for the formability of the support into a containment structure of the capsule (e.g., body and rim). For formability reasons, the aluminum layer is preferably comprised between 40 and 250 microns, most preferably between 50 and 150 microns. Within these ranges, the aluminum thickness may also provide gas barrier properties for preserving the freshness of the ingredient in the capsule, in particular, when the capsule further comprises a gas barrier membrane sealed onto the rim.

The code support may be formed from a laminate which is deformed to form the rim 22 and body 23 of the capsule (FIGS. 3a-3b). In such case, the laminate has the composition of the base structure 500 and is printed with the light-absorbing ink portions 400-403 in the flat configuration before the forming operation of the capsule (e.g., body, rim). The printing of the ink portions must thus take into effect the subsequent deformation of the laminate so that it enables a precise positioning of the coded surfaces. The type of ink can be a mono-component, bi-component, PVC based or PVC-free based inks. The black ink is preferred as it provides a lower reflectivity and higher contrast than colored inks. However, the black ink portions could be replaced by equivalent colored ink portions, preferably dark or opaque inks. The ink may comprise, for instance, 50-80% wt. of color pigments.

Preferably, the metal layer is aluminum and has a thickness comprised between 6 and 250 microns. The primer enables to level the rugosity of the metal (i.e., aluminum) layer. It also improves the bonding of the inks on the metal layer, in particular, aluminum. The primer must remain relatively thin to diminish the diffusion of the light beam. Preferably, the thickness of the primer is comprised between 0.1 and 5 microns, most preferably between 0.1 and 3 microns. The density of the primer is preferably comprised between 2 and 3 gsm, for example, is of about 2.5 gsm.

Optionally, the base structure may comprises additional layers, on the non readable side, preferably a polymer layer such as polypropylene or polyethylene and an adhesive layer 525 for bonding the polymer layer 520 onto the metal layer 510 or heat seal lacquer enabling sealing of lid or membrane on the rim of the capsule or an internal protective lacquer or varnish. The support as defined can form an integrated part of the capsule, e.g., of the capsule flange-like rim and body.

A preferred base structure according to the mode of FIG. 9, comprise respectively from the B side to the A side of the support: a polypropylene layer of 30 microns, an adhesive, an aluminum layer of 90 microns, a polyester layer of 2 microns and density of 2.5 gsm and black ink portions of 1 micron. In an alternative mode, the primer layer is replaced by a lacquer of thickness 5 microns, preferably a density of 5.5 gsm, and containing 5% (wt.) metal pigments. It should be noted that an additional protective clear coat can be applied onto the primer 515 to cover and protect the ink layers 528 (not shown).

Figure 10:
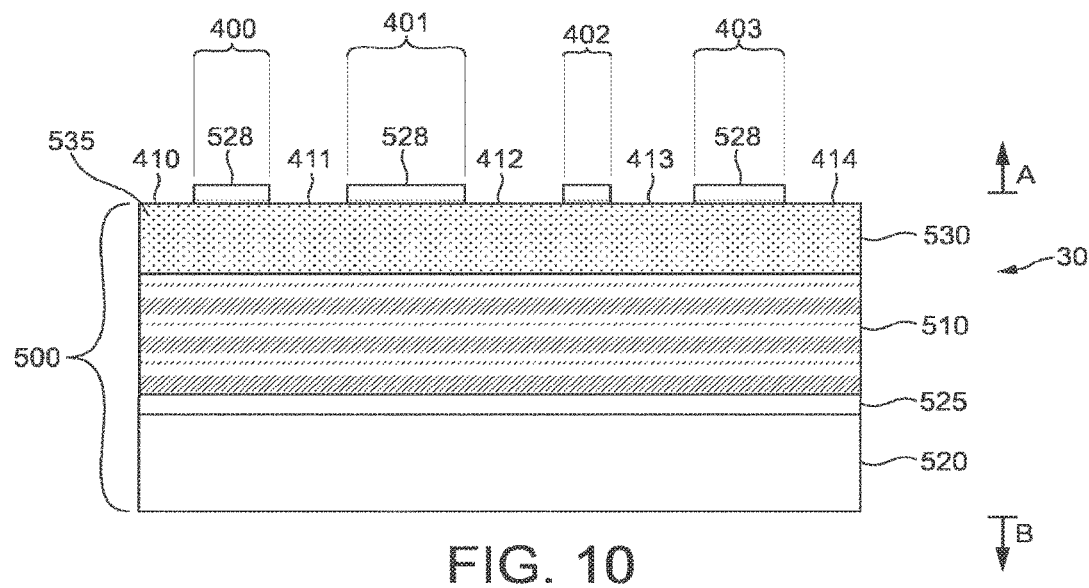
FIG. 10 is a second example of an optically readable coded support along circumferential cross-section view in radial direction R at the rim of the capsule of FIG. 4.
Figure 11:
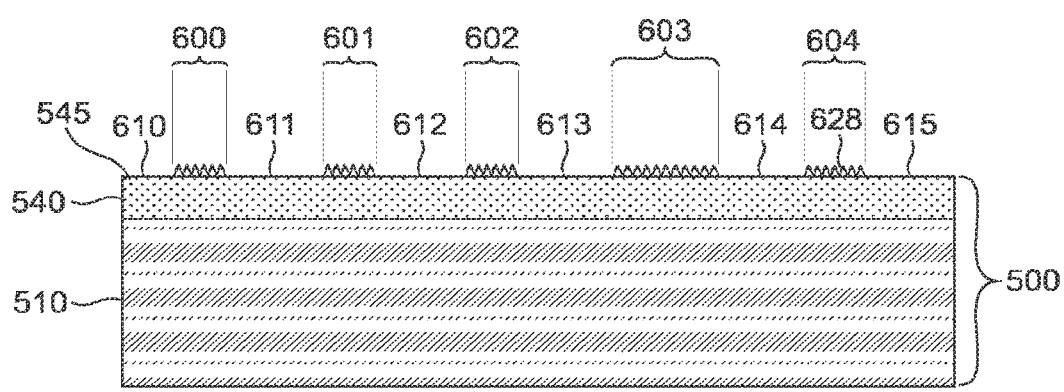
FIG. 11 is a third example of an optically readable coded support in circumferential cross-section view in radial direction R at the rim of the capsule of FIG. 4, FIGS. 12 to 14 illustrate graphical representations of the measure of reflectivity in % respectively for optically readable code supports according to the invention and for another comparative code support.

FIG. 10 relates to another mode of the code support 30 of the invention. In this case, the base structure comprises a lacquer 530 replacing the primer 510 of FIG. 9. The lacquer is a polymeric layer embedding metallic pigments 535 such as aluminum, silver or copper pigments or mixtures thereof. The ink layers 528 are applied onto the lacquer. The thickness of the lacquer is somewhat greater than the thickness of the primer 510 of FIG. 9, preferably, comprised between 3 and 8 microns, most preferably between 5 and 8 microns. The metallic pigments enable to compensate for the reduction of the reflectivity of the metal layer by the increased thickness of the polymer. The lacquer also levels the rugosity of the metal layer. Preferably, the ratio of metallic pigments to lacquer is of at least 1% in weight, more preferably is comprised between 2 and 10% in weight. It should be noted that an additional protective clear coat can be applied onto the lacquer 530 to cover and protect the ink layers 528 (not shown). FIG. 11 relates to another mode of the code support 30 of the invention. In this case, the base structure 500 comprises a metal and/or polymer layer 540 having mirror surfaces 610-615 and roughened surfaces 600-604. The mirror surfaces 610-615 may be obtained by providing a rugosity Rz lower than 5 microns, preferably comprised between 0.2 and 2 microns. The light-absorbing surfaces 600-604 are obtained by forming roughened surface portions with a rugosity Rz higher than 2 microns and more preferably higher than 5 microns. For example, the mirror surfaces are formed in a polymeric layer 540, such as polyester or isocyanate, including metal pigments 545. The roughened surfaces of the base structure can be obtained by any suitable technique such as sanding, shot blasting, milling, laser engraving, chemical attack and combinations thereof. The ratio of pigments in the polymeric layer 540 may be of at least 5% in weight, preferably between 10 and 30% in weight. A support layer 510 can be provided which is preferably a metal layer such as aluminum. It should be noted that layers 510 and 540 could be replaced by a single metal or polymeric layer. It should be noted that an additional protective clear coat can be applied onto the layer 540 to cover and protect the light reflective and light absorbing surface portions 600-615 (not shown).

In the present invention, the reference to specific metals encompasses the possible alloys of such metals in which the metal represents the major component in weight, for instance, aluminum encompasses alloys of aluminum.

EXAMPLES

Capsules comprising an integrated code support have been tested to evaluate the level of reflectivity of the signal (bit 1/bit 0). The tests were performed in a simplified configuration of the device of FIGS. 2*a* and 2*b* with the capsule holder 32 removed and replaced by a transparent clamping plate holding the rim of the capsule and provided with an open air passage for the light beams. The angle between the sender path and receiver path was of 8°, distributed with 4° on each side of the normal axis N.

Figure 12:
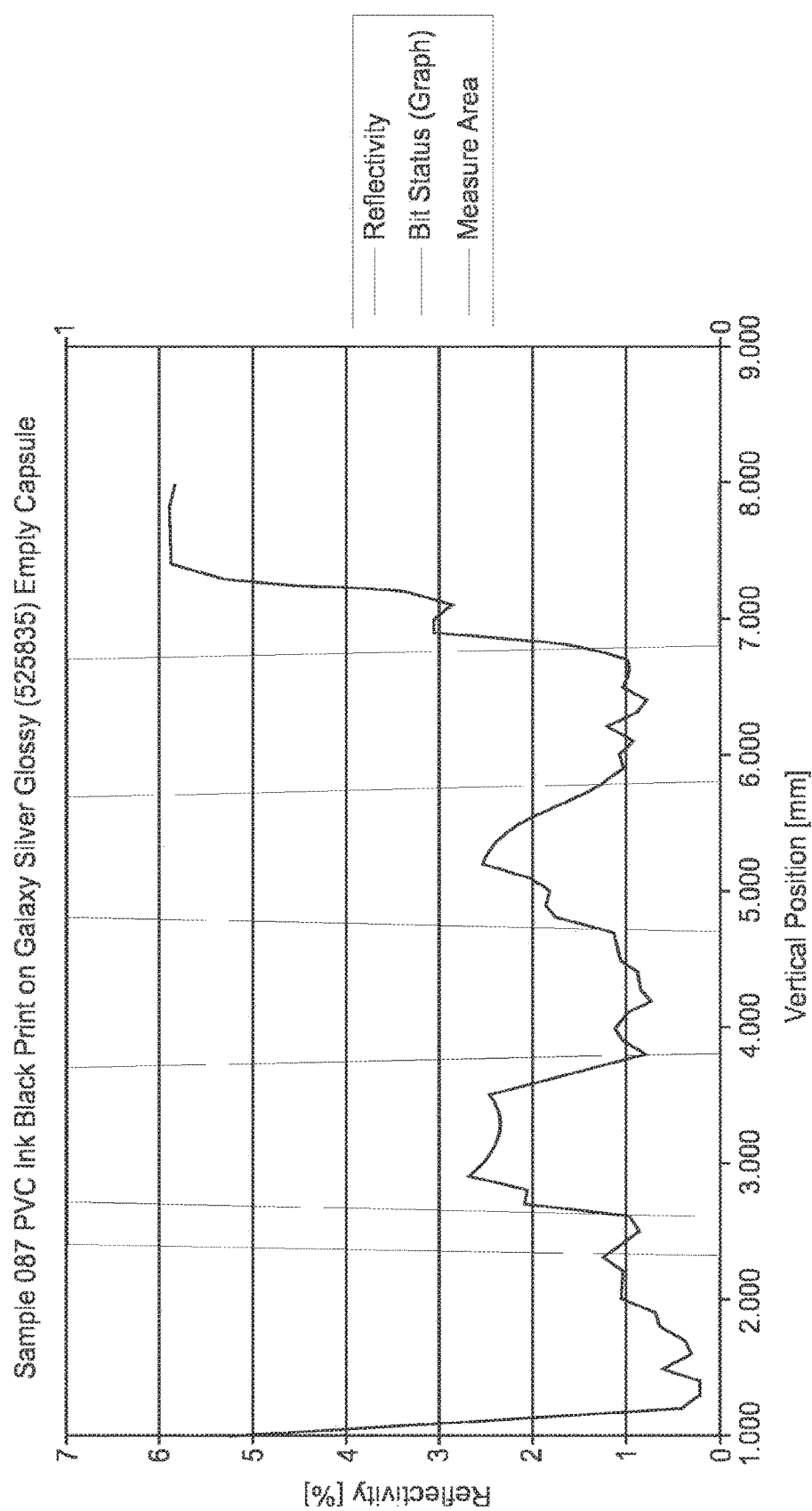

Example 1—Detectable Code with Light-Reflective Surfaces by the Base Structure with Colored Lacquer and Light-Absorbing Surfaces by the Overlying Ink Portions The support comprised a reflective base structure formed of aluminum of 30 microns coated with aluminum pigmented lacquer of 5 microns and 5.5 gsm. The absorbing surfaces were formed of a layer of one-micron black PVC ink sold by Siegwerk. The reflective surfaces were produced by the base structure (bit 1) and the absorbing surfaces (bit 0) were produced by the black ink portions. The maximal reflectivity measured for the reflective surfaces (bit 1) was 2.68%. The spread on bit 1 was of 1.32%. The minimum reflectivity measured for the absorbing surface (bit 0) was 0.73%. The spread on bit 0 was 0.48%. The results are graphically illustrated in FIG. 12.

Figure 13:
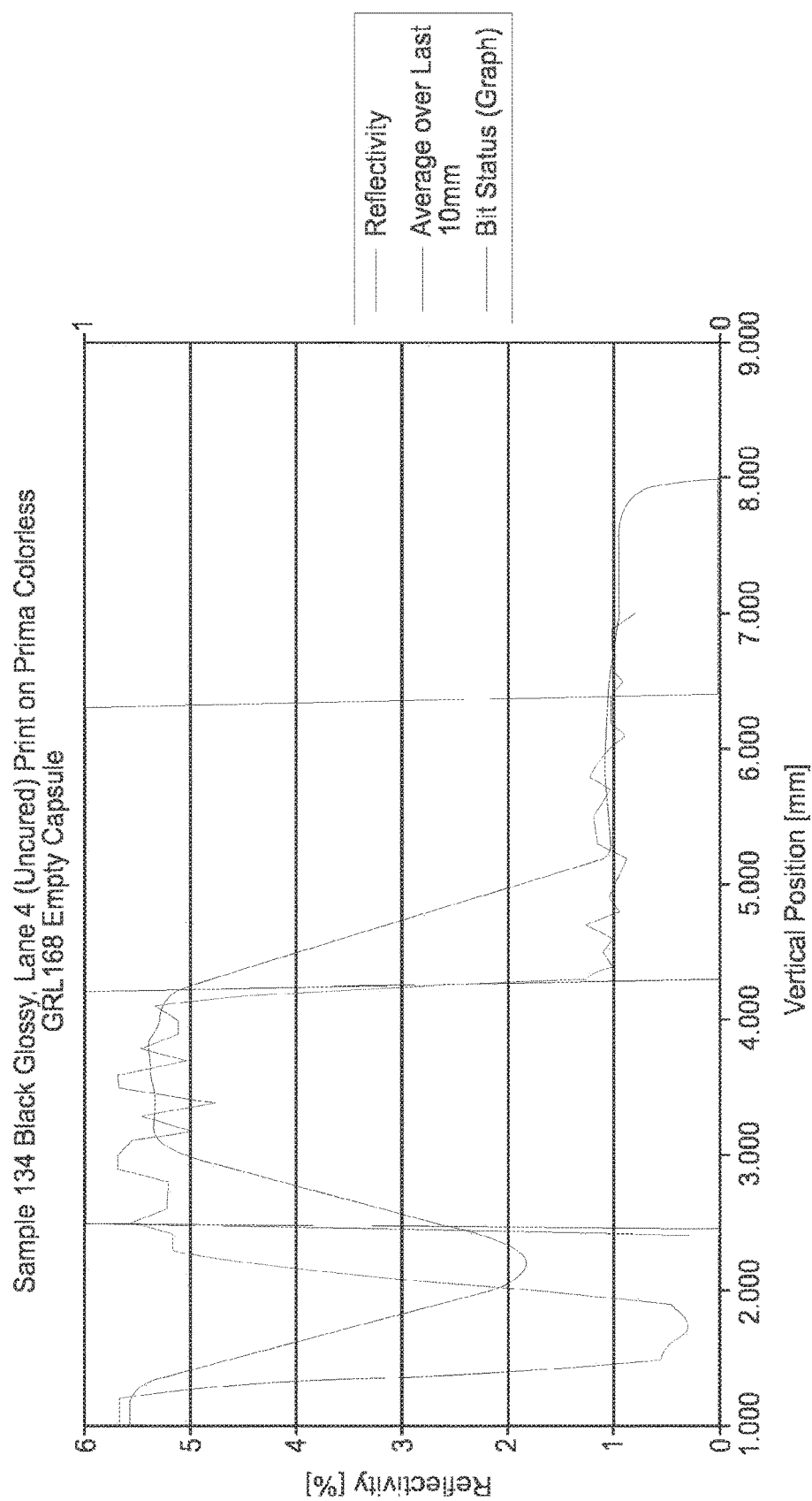

Example 2—Detectable Code with Light-Reflective Surfaces by the Base Structure with Colorless Primer and Light-Absorbing Surfaces by the Overlying Ink Portions The reflectivity measurement was performed on an empty capsule comprising an optical reading support comprising a base structure forming the reflective surfaces and ink portions forming the absorbing surfaces. For this, the base structure comprised from the B-side to the A (readable) side respectively: a polypropylene layer of 30 microns, adhesive, an aluminum layer of 90 microns, a polyester primer of 2 microns and 2.5 gsm (density). Discontinuous bit portions of back ink of 1 micron sold by Siegwerk were printed onto the surface of the primer. The support was formed by deep drawing into a body of capsule after ink printing. The reflective surfaces were therefore produced by the base structure (bit 1) and the absorbing surfaces (bit 0) were produced by the black ink portions. The reflectivity of the support was measured. The results are graphically illustrated in FIG. 13. The maximal reflectivity measured for the reflective surfaces (bit 1) was 5.71%. The spread on bit 1 was of 1.49%. The minimum reflectivity measured for the absorbing surface (bit 0) was 0.87%. The spread on bit 0 was 0.47%.

Figure 14:
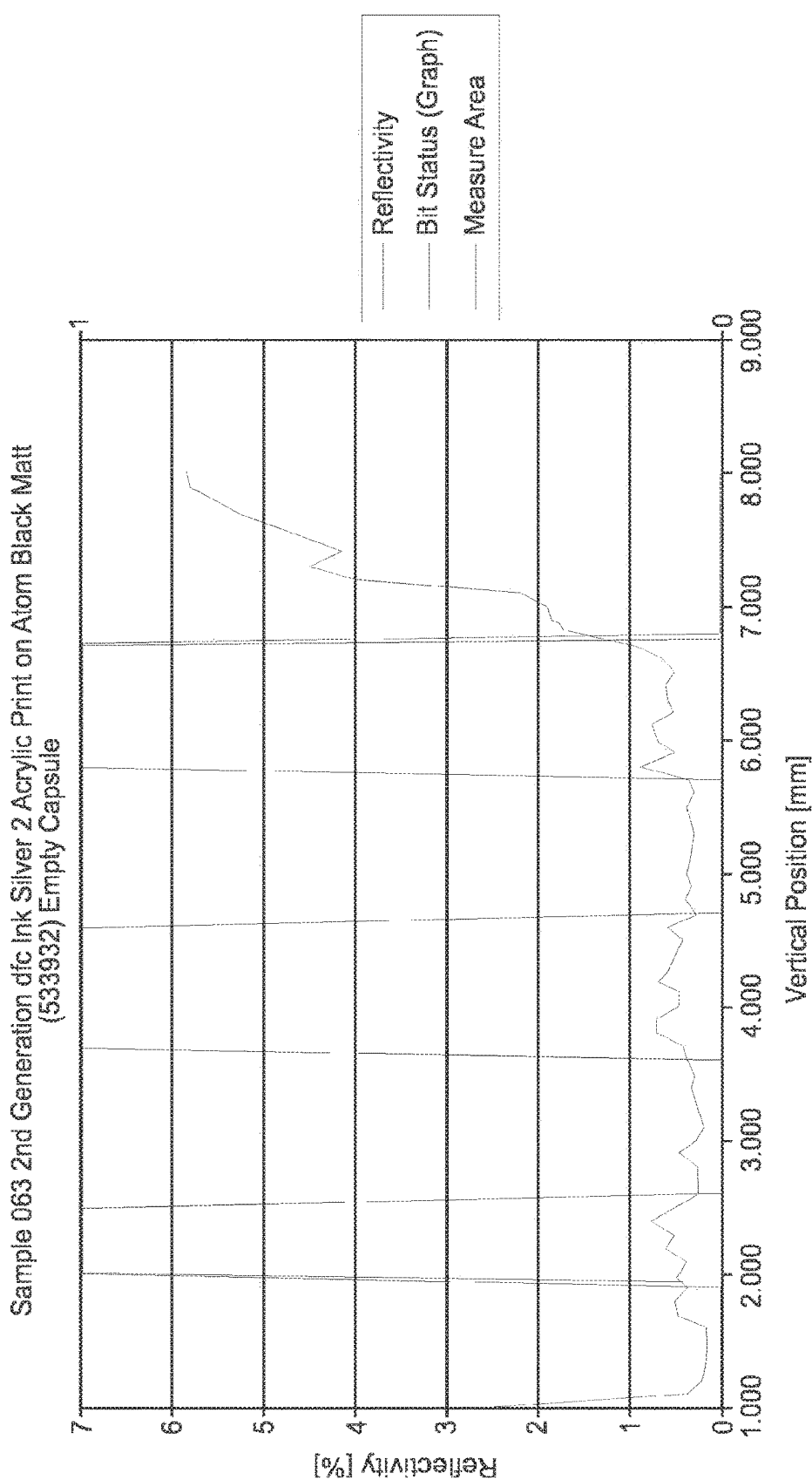

Example 3—Non-Detectable Code with Light-Absorbing Surfaces by the Base Structure and the Light-Reflective Surfaces by the Overlying Ink Portions The reflectivity measurement was performed on an empty capsule comprising an optical reading support comprising a base structure forming the absorbing surfaces and ink portions forming the reflective surfaces. For this, an aluminum support layer was covered with a continuous matt black lacquer of 5-micron thickness. The reflective surfaces were produced by discrete portions of ink having a thickness of 1 micron containing more 25% by weight of light-reflective silver pigments. Surprisingly, the signal was not differentiable enough between bit 1 and bit 0. The results are graphically illustrated in FIG. 14. The maximal reflectivity measured for the reflective surfaces (bit 1) was 0.93%. The minimum reflectivity measured for the reflective surfaces (bit 1) was 0.53%. The minimum reflectivity measured for the absorbing surface (bit 0) was 0.21%. The spread on bit 0 was 0.23%.

Example 4

An optically readable code support (30, 60*a*, 60*b*) to be associated with or be part of a capsule intended for delivering a beverage in a beverage producing device by centrifugation of the capsule, the support comprising at least one sequence of symbols represented on the support so that each symbol is sequentially readable by a reading arrangement of an external reading device while the capsule is driven in rotation along an axis of rotation, wherein the symbols are essentially formed of light reflective surfaces (400-403; 610-615) and light absorbing surfaces (410-414; 600-604) characterized in that it comprises a base structure (500) extending continuously at least along said sequence of symbols and discontinuous discrete light-absorbing portions (528; 628) locally applied onto or formed at the surface of said base structure; wherein the discontinuous discrete light-absorbing portions form the light-absorbing surfaces and the base structure (500) forms the light-reflective surfaces (400-403; 610-615) outside the surface areas occupied by the discrete light-absorbing portions; said discrete light-absorbing portions (410-414; 600-604) are arranged to provide a lower light-reflectivity than the one of the base structure outside the surface areas occupied by the discrete light-absorbing portions.

Example 5

Optically readable code support according to example 4, wherein the light-reflective base structure (500) comprises metal arranged in the structure to provide the light reflective surfaces.

Example 6

Optically readable code support according to example 5, wherein the light-reflective base structure comprises a monolithic metal support layer (510) and/or a layer of light-reflective particles (530, 540) preferably metal pigments in a polymeric matrix.

Example 7

Optically readable code support according to examples 5 or 6, wherein the metal is chosen amongst the group consisting of: aluminum, silver, iron, tin, gold, copper and combinations thereof.

Example 8

Optically readable code support according to examples 6 or 7, wherein the light-reflective base structure comprises a monolithic metal support layer (510) coated by a transparent polymeric primer (515) so as to form the reflective surfaces (410-414) or an inner polymeric layer coated by an outer metallic layer (e.g., by vapor metallization of the polymeric layer).

Example 9

Optically readable code support according to example 8, wherein the non-metallic transparent polymeric primer (515) has thickness of less than 5 microns, most preferably between 0.1 and 3 microns.

Example 10

Optically readable code support according to example 7, wherein the light-reflective base structure comprises a monolithic metal support layer (510) or polymeric support layer; said layer being coated by a lacquer (530) comprising light-reflective particles, preferably metal pigments (535).

Example 11

Optically readable code support according to example 10, wherein the lacquer (530) has a thickness higher than 3 microns and less than 10 microns, preferably comprised between 5 and 8 microns.

Example 12

Optically readable code support according to examples 10 or 11, wherein the lacquer (530) comprises between 2 and 10% by weight of metal pigments (535), preferably about 5% by weight pigments.

Example 13

Optically readable code support according to any of the preceding examples 4 to 12, wherein the discontinuous light-absorbing portions (528) are formed by an ink applied onto the said base structure (500).

Example 14

Optically readable code support according to example 13, wherein the ink has a thickness between 0.25 and 3 microns.

Example 15

Optically readable code support according to examples 13 or 14, wherein the ink comprises at least 50% by weight of pigments, more preferably about 60% by weight.

Example 16

Optically readable code support according to any of the preceding examples 4 to 15, wherein the discontinuous light-absorbing portions (528) forms roughened surfaces (600-604) of the base structure having a rugosity (Rz) of at least 2 microns, preferably between 2 and 10 microns, most preferably of about 5 microns.

Examples 17

Optically readable code support according to example 16, wherein the roughened surface portions are obtained by applying a roughened layer of ink onto the base structure or is formed directly in the surface of the base structure (500) by sanding, shot blasting, milling, chemical attack, laser engraving, in-mold forming and combinations thereof.

Example 18

Capsule comprising an optically readable code support according to any of the preceding examples 4 to 17.

Example 19

Capsule indented for delivering a beverage in a beverage producing device by centrifugation comprising a body (22), a flange-like rim (23) and an optically readable code support (30, 60a, 60b) according to any of the preceding examples 4 to 18, wherein the code support (30, 60a, 60b) is an integral part of at least the rim (23) of the capsule, wherein the body (22) and rim (23) of the capsule are obtained by forming, such as by deep drawing, a flat or preformed structure comprising said support (30, 60a, 60b).

The invention is claimed as follows:

1. A method of reading an optically readable code, the method comprising:
   rotating a capsule on an axis of rotation in a beverage producing device, the capsule comprising a beverage ingredient and an optically readable code support, the support comprising at least one sequence of symbols represented on the support, wherein the at least one sequence of symbols are essentially formed of a pattern of light-reflective surfaces and light-absorbing surfaces, the light-absorbing surfaces providing a lower light-reflective intensity than the light-reflective surfaces, the support comprises at least one base layer or structure extending continuously at least along the at least one sequence of symbols, and the light-absorbing surfaces are roughened surfaces having a higher rugosity than the light-reflective surfaces;
   sequentially reading each of the symbols by a reading arrangement of an external reading device while the capsule is rotating;
   supplying a liquid to the capsule while the capsule is rotating to form a centrifuged liquid; and
   delivering a beverage from the capsule, the beverage comprising the centrifuged liquid.

2. The method of claim 1, wherein the light-reflective surfaces are non-roughened or mirror-reflective surfaces of the at least one base layer or structure.

3. The method of claim 1, wherein the light-absorbing surfaces are formed integrally in the at least one base layer or structure.

4. The method of claim 1, wherein the light-reflective surfaces and the light-absorbing surfaces are arranged such that an incident light beam of given inclination is reflected, at a maximum of intensity, as reflected light beams within about the same reflection angle.

5. The method of claim 1, wherein the light-reflective surfaces and the light-absorbing surfaces are arranged such that an incident light beam of given inclination is reflected, at a maximum of intensity, as reflected light beams at reflection angles which differ from each another by less than 90 degrees.

6. The method of claim 1, wherein the light-reflective surfaces and the light-absorbing surfaces are arranged such that an incident light beam of given inclination is reflected, at a maximum of intensity, as reflected light beams at reflection angles which differ from each another by less than 45 degrees.

7. The method of claim 1, wherein the optically readable code support has an annular configuration.

8. The method of claim 1, wherein the light-absorbing surfaces have a rugosity between 5 and 10 microns.

9. The method of claim 1, wherein the light-reflective surfaces have a rugosity less than 1 micron.

10. The method of claim 1, wherein the pattern of light-reflective surfaces and light-absorbing surfaces extends along only a portion of a circumference of the support.

11. The method of claim 1, wherein the pattern of light-reflective surfaces and light-absorbing surfaces extends along an entirety of a circumference of the support.

12. The method of claim 1, wherein the pattern of light-reflective surfaces and light-absorbing surfaces comprises a polymeric lacquer containing pigments that provide the rugosity, and portions of the polymeric lacquer are locally removed to uncover reflective surfaces of a metal layer underneath the polymeric lacquer.

13. The method of claim 1, wherein the at least one sequence of symbols comprises between 100 and 200 symbols that each cover an arcuate area of the support.

14. The method of claim 1, wherein the sequential reading of each of the symbols comprises emitting an infrared light and converting a received light beam into a current or voltage signal.

* * * * *